United States Patent
Wang

(10) Patent No.: US 9,838,048 B2
(45) Date of Patent: Dec. 5, 2017

(54) CHANNELIZED ACTIVE NOISE ELIMINATION (CANE) FOR BIT STREAM RF TRANSMITTERS

(71) Applicant: THE REGENTS OF THE UNIVERSITY OF CALIFORNIA, Oakland, CA (US)

(72) Inventor: Yuanxun Ethan Wang, Manhattan Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 2 days.

(21) Appl. No.: 14/973,061

(22) Filed: Dec. 17, 2015

(65) Prior Publication Data

US 2016/0182102 A1    Jun. 23, 2016

Related U.S. Application Data

(60) Provisional application No. 62/094,231, filed on Dec. 19, 2014.

(51) Int. Cl.
    *H04B 1/04*    (2006.01)
(52) U.S. Cl.
    CPC ......... *H04B 1/0475* (2013.01); *H04B 1/0483* (2013.01)
(58) Field of Classification Search
    CPC .......... H04B 1/02; H04B 1/04; H04B 1/0458; H04B 1/0475; H04B 1/0483; H04B 2001/0408; H04B 15/00; H04B 15/005; H03M 1/66; H03M 1/72
    USPC ........ 375/247, 254, 285, 295–297; 330/149; 341/143, 144; 381/94.1; 455/114.2, 455/114.3
    See application file for complete search history.

(56) References Cited

U.S. PATENT DOCUMENTS

| | | | |
|---|---|---|---|
| 6,054,894 A * | 4/2000 | Wright | H03F 1/0294 330/124 R |
| 7,053,709 B1 * | 5/2006 | Darvish-Zadeh | H03F 1/3241 330/136 |
| 7,196,576 B2 * | 3/2007 | Mizuta | H03F 1/3247 330/151 |
| 2012/0224653 A1 * | 9/2012 | Lozhkin | H03F 1/0294 375/297 |
| 2012/0294387 A1 * | 11/2012 | Ghannouchi | H03F 1/0288 375/295 |

* cited by examiner

*Primary Examiner* — Young T Tse
(74) *Attorney, Agent, or Firm* — O'Banion & Ritchey LLP; John P. O'Banion

(57) ABSTRACT

A band pass filter is implemented utilizing Channelized Active Noise Elimination (CANE) in combining Finite Impulse Response (FIR) filtering into a radio frequency (RF) transmitter, or transmission path. The FIR filtering is performed in a combination of multiple conversion paths of delay units, vector modulators and PAs so that the low pass characteristics of the FIR filter are upconverted on the adjacent frequency of the carrier to form a band pass filter at the output of the transmitter. Use of CANE avoids the need of high sampling rates, while also eliminating the need of either broad bandwidth delay lines or modulated power amplifiers. The technique is well-suited for suppression of the quantization noise generated in RF transmitters with bitstream modulations such as the Envelope Delta Sigma Modulation (EDSM).

20 Claims, 4 Drawing Sheets

CHANNELIZED ACTIVE NOISE ELIMINATION (CANE) FOR BIT STREAM RF TRANSMITTERS

CROSS-REFERENCE TO RELATED APPLICATIONS

This application claims priority to, and the benefit of, U.S. provisional patent application Ser. No. 62/094,231 filed on Dec. 19, 2014, incorporated herein by reference in its entirety.

STATEMENT REGARDING FEDERALLY SPONSORED RESEARCH OR DEVELOPMENT

This invention was made with Government support under N00014-12-1-0037, awarded by the U.S. Navy, Office of Naval Research. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

The technology of this disclosure pertains generally to band pass filtering in RF transmission, and more particularly to incorporating an FIR filter into Envelope Delta-Sigma Modulation (EDSM) to create band pass filtering with Channelized Active Noise Elimination (CANE).

2. Background Discussion

In designing bitstream transmitters, a problem arises as high sampling rates spread the bandwidth of the signal to be amplified, making it problematic for matching impedance at the power amplifier (PA). In these bitstream approaches the generated quantization noise not only increases receiver noise figure, but also impacts even remote frequency bands. In addition, insertion loss arises in the output network which can significantly degrade power efficiency. Dynamic impedance arises as a result of interaction between the PA and the output network which can lead to excessive signal distortion and power dissipation.

Switching mode power amplifiers can achieve high power efficiency by operating in the saturation region. These PAs are well-suited for the amplification of constant envelope signals but not signals with high Peak-to-Average Power Ratio (PAPR) as the linearity of modulation suffers from the saturation. Bitstream modulated RF transmitters based on Delta-Sigma modulations, such as Low Pass Delta-Sigma Modulation (LPDSM) or Envelope Delta-Sigma Modulation (EDSM) involves the oversampling and noise shaping to convert non-constant envelope to constant envelope and employs an output filter to remove the out-of-band quantization noise and recycle the noise power back to DC power supply. Therefore, in these approaches high power efficiency can be obtained without corrupting the signal integrity.

However, to obtain the desired Adjacent Channel Power Ratio (ACPR), the transmitter requires either high oversampling delta-sigma modulation to shape the quantization noise further from signal band, or utilize a high quality factor output filter. Unfortunately, the former raises the complexity of the modulator design while the latter usually results in a bulky and lossy filter. Even though the quantization noise is near, but not immediately adjacent to the signal, it may still be located in the filter pass band.

To solve this problem, a Finite Impulse Response (FIR) filtering technique has been employed to suppress quantization noise in the bitstream modulated transmitters. The essential idea is to leverage the combining effect of multiple channel power amplifiers to suppress the output noise while the high operating efficiency of power amplifier in each channel is maintained. The FIR structure can either provide band pass filtering or low pass filtering. The band pass filtering with FIR utilizes the higher order pass band of the filter to suppress the quantization noise of digitized Radio Frequency (RF) signal with a pass band at the signal carrier frequency.

It will be noted that LPDSM with FIR bandpass filtering has been demonstrated. While in the literature it has been proposed to filter the bitstreams generated by EDSM with the band pass FIR, where the carrier frequency selection is bound by the delay time selection, with broad bandwidth delay lines being required, due to the fact that RF delay lines are used in that approach. In other proposals a polar transmitter with Delta-Sigma Modulated power supply with low pass FIR is described. However, in that approach only the quantization noise in the envelope path is suppressed, which raises the spectrum regrowth problem in the final modulated RF signal.

Accordingly, a need exists for a Finite Impulse Response (FIR) filtering technique which suppresses near-band quantization noise, without the need to correlate time delay units with the carrier frequency to form a pass band at the signal carrier.

BRIEF SUMMARY

A band pass filter is implemented utilizing a Channelized Active Noise Elimination (CANE) technique to implement Finite Impulse Response (FIR) filtering within a bitstream modulation technique (e.g., EDSM) so that the low pass characteristics of the FIR filter is used with upconverted carrier to form a band pass filter. The use of CANE avoids the need of a high sampling rate and of utilizing a broad bandwidth delay line.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Generalized Embodiment

Figure 1A:
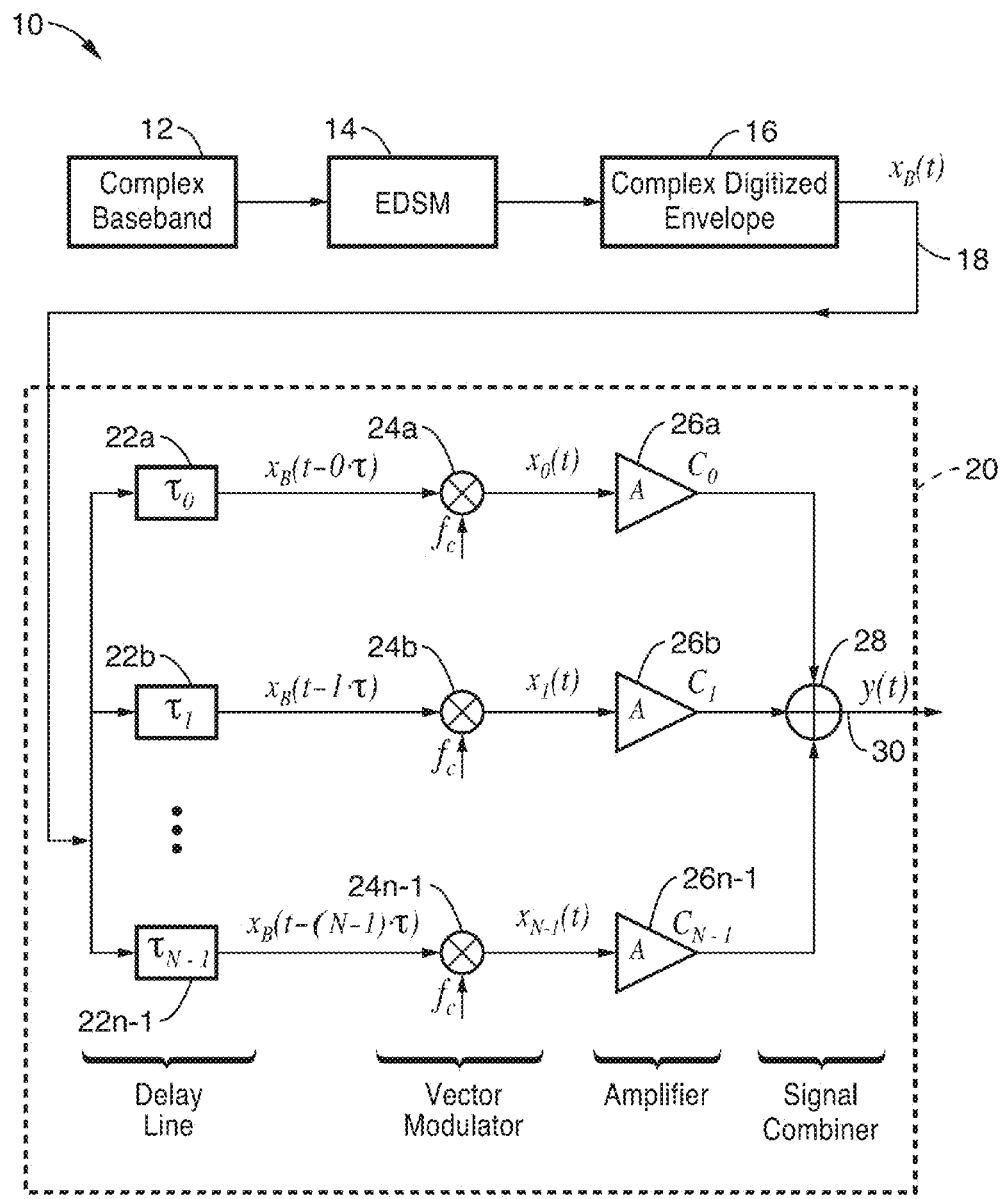
FIG. 1A through FIG. 1D show block diagrams of Channelized Active Noise Elimination (CANE) applied to RF transmitters with EDSM according to an embodiment of the present disclosure in FIG. 1A, and showing different combiner compositions in FIG. 1B through FIG. 1D.

FIG. 1A illustrates an example embodiment 10 of a bitstream transmission technique using Channelized Active Noise Elimination (CANE) to implement a form of upconverted Finite Impulse Response (FIR) filtering for a bitstream modulation technique, such as Envelope Delta Sigma Modulation (EDSM), and is well-suited for use in an RF transmitter so that the low pass characteristics of the FIR filter upconverted carrier forms a band pass filter.

Figures 1B, 1C:
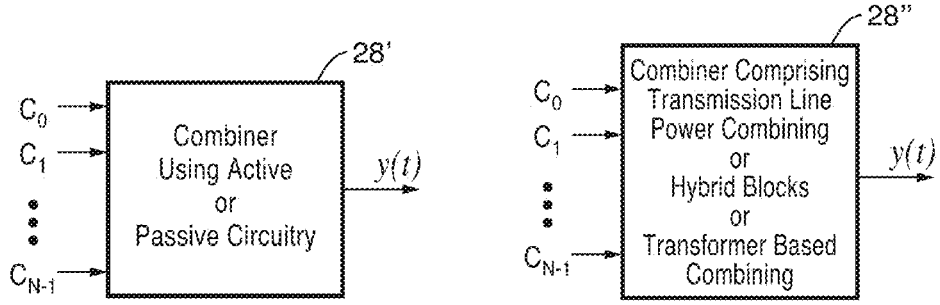
Figure 1D:
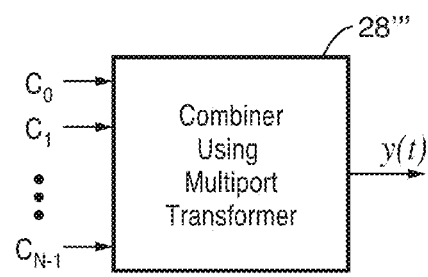

A complex baseband signal is generated 12, and its envelope is taken and received for bitstream modulation, exemplified but not limited to the use of EDSM, in block 14, with the output of digitized envelope received at block 16 which generates a complex digitized envelope $x_B(t)$ 18 by multiplying the digitized envelope with the phase of the original baseband signal for receipt by the digital to analog circuitry 20 of CANE, which provides a form of digital-to-analog conversion, with FIR, through power combining. This complex digitized envelope passes through a stage of parallel delay lines 22a, 22b, ... 22n-1, are shown outputting $x_B(t-0\cdot\tau)$, $x_B(t-1\cdot\tau)$, through to $x_B(t-(N-1)\cdot\tau)$ prior to being received by vector modulators 24a, 24b, ... 24n-1, which each receive a carrier frequency $f_c$, and modulating the complex sequence $x_0(t)$, $x_1(t)$, through to $x_{N-1}(t)$ on that carrier. Output from each of the modulators is amplified by PA blocks 26a, 26b, ... 26n-1 with gains of $C_0, C_1, \ldots C_{N-1}$ that are combined in signal combiner 28 with output y(t) 30 as an RF signal. The combiner 28 may be implemented in a number of different ways. FIG. 1B depicts a signal combiner 28' comprising active or passive circuitry. FIG. 1C depicts signal combiner 28" comprising transmission line power combining, or hybrid blocks, or transformer based combining. And FIG. 1D depicts a signal combiner 28''' using a multiport transformer. By way of example and not limitation, the switched-mode amplifiers of PA blocks 26a, 26b, ... 26n-1 may comprise any of various amplifiers including forms of Class D, Class S amplifiers, PLM with single-ended switched-mode PA (Class B, E, F), and the like.

In at least one embodiment, the EDSM 14 and complex digitized envelope 16 may be bypassed, with the complex baseband signal generated in block 12 directly driving the digital to analog circuitry 20 of CANE. In this embodiment, CANE operates strictly as a filter to suppress the correlated noise and distortion generated in PA blocks 26a, 26b, ... 26n-1.

After the power amplification stage, passive filtering is performed along with the multi-bit power combining. The signal power combining can be performed utilizing various active or passive circuitry. In at least one embodiment, the signal combiner comprises a multiport transformer, having inputs ports $N_1, N_2, \ldots N_K$, with a combined output $N_{out}$. The number of turns of the input coils can be utilized as the weighting function for the different input bits, while the ratio of the input and output turns can be used for impedance matching.

The advantage of CANE compared to conventional FIR filtering is its narrow bandwidth, low sampling rate requirement and arbitrary carrier frequency and filter bandwidth selections. For example, if a higher passband of the FIR filter is used for bandpass filtering, the choices of time delay unit are limited by carrier frequency to obtain a pass-band at the signal band. For example, the delay unit is selected to be $\tau=K/(2f_c)$, where K is a nonzero integer. This implies the total time delay will be much longer than the short clock period to achieve narrow band filtering, resulting in larger time steps in the delay line.

In EDSM with CANE, for each channel "i", the delayed signal modulating on the carrier as indicated at 24a, 24b, ... of FIG. 1A is given by:

$$x_i(t)=x_B(t-i\tau)e^{j2\pi f_c t} \quad (1)$$

where $x_B(t)$ is the complex digitized constant envelope signal, at block 18. After combining, the output signal at block 30 will be $$y(t)=Ae^{j2\pi f_c t}\Sigma_{i=0}^{N-1}C_i x_B(t-i\tau). \quad (2)$$

Its spectrum is then given by:

$$Y(f)=AX_B(f-f_c)H(f-f_c) \quad (3)$$

where $X_B(f)$ is the baseband signal spectrum and H(f) is the equivalent filter frequency response, which is given by $$H(f)=\Sigma_{i=0}^{N-1}C_i e^{-j\cdot 2\pi f\tau} \quad (4)$$

It should be noted that Eq. (4) indicates the pass band of the filter H(f) is at DC and it is upconverted to the carrier frequency $f_c$ as indicated in Eq. (3), regardless of the delay selection r. The choice of sampling rate and time delay unit does not impact the frequency of passband and can thus be made independent of the carrier frequency. Thus, the noise shaping performance is the only concern in selecting sampling rate, which allows a higher carrier frequency with a relatively low sampling frequency, (e.g., $f_c$=2 GHz while $f_s$=320 MHz. It should also be appreciated that the time delay unit does not need to be correlated with $f_c$ to form a pass-band at the signal carrier and it can thus be chosen arbitrarily to satisfy the filtering requirement. The precision of the delay unit does not change the passband frequency like in other bandpass filter techniques. Accordingly, the long time step required in other techniques is unnecessary in EDSM with CANE.

It will be seen from the figure that in the EDSM transmitter structure, the phase path and digitized path are recombined by vector modulators 24a, 24b, ... 24n-1 before being received into switching power amplifiers (PAs) 26a, 26b, ... 26n-1. Therefore, unlike previous approaches modulated power supplies are not required.

2. Power Combining Based FIR Filter

One principle of CANE relies on the power combining at the output stage of PAs. It should be appreciated that a number of power combining techniques can be utilized without departing from the teachings of the present disclosure, including transmission line based power combining, hybrid blocks (e.g., 180 degree hybrids), and transformer based power combiners when implementing the equivalent FIR filter. In using a transformer, it will be noted that the turns ratio of the transformer primary and secondary coils is selected to achieve different types of filter and impedance matching. It will be recognized that combining multiple channels of signals using passive devices is fundamentally lossless for the in-band signal when they are essentially the same sequence even after the delay. On the other hand, the out-of-band noise is eliminated by using power saving modes, such as reflecting the noise power back to the DC supply through a high-impedance termination over the stop band frequencies, or power dissipating mode, such as consumed by resistive component, e.g., Wilkinson power combiner.

Figure 2:
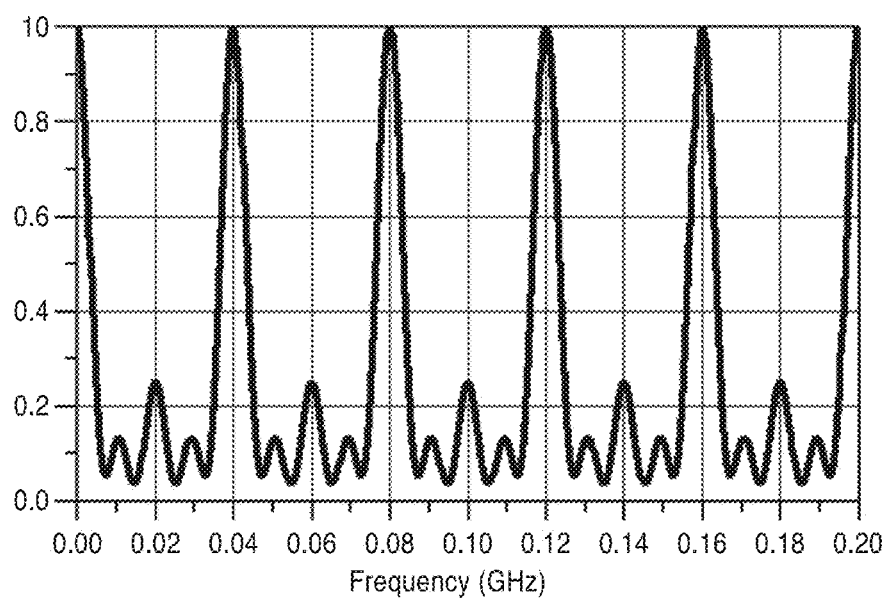
FIG. 2 is a plot of power combining efficiency utilizing four channels uniform weighting in a transformer based signal combiner according to an embodiment of the present disclosure.

FIG. 2 depicts power combining efficiency of an example four channel uniform weighting transformer based power combiner simulated in Agilent Advanced Design System (ADS). The transformer turns ratios are selected in this example to be 1:$\sqrt{2}$ such that all the input and output ports are matched to 50 Ohm (by way of example and not limitation), by which each channel can provide 1 dBm power. In this example, the delay unit is 25 ns, thus the pass-band exists periodically for every 40 MHz. The figure shows that in band power combining efficiency is 100%. Thus, in-band signal combining of CANE is lossless. However, it will be noted that the power is suppressed to a low level outside of the signal-band.

3. Simulation and Experimental Results

Figure 3A:
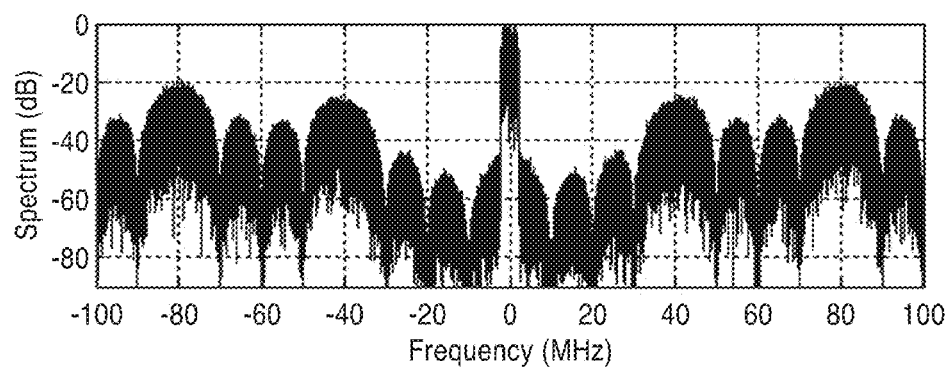
FIG. 3A and FIG. 3B are spectra of EDSM approaches, with EDSM CANE spectra depicted with delay matched phase in FIG. 3A, and spectra of an EDSM approach without phase path delay shown in FIG. 3B.
Figure 3B:
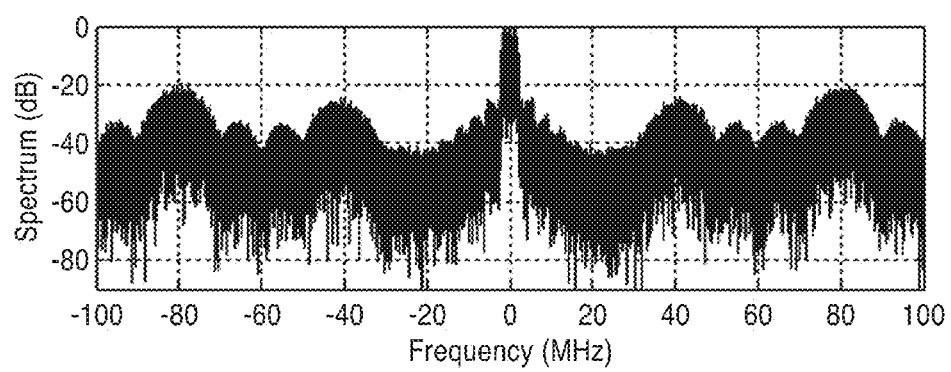

FIG. 3A and FIG. 3B depict spectrum results from an example embodiment of EDSM filtering showing CANE with delay-matched phase in FIG. 3A, and an approach without phase path delay in FIG. 3B. The EDSM CANE was simulated with four channels using uniform weighting combining, with sampling rate is 320 MHz and time delay step is 8 points, corresponding to the time delay units of 25 ns. In the simulation of FIG. 3A, the Signal to Quantization Noise Ratio (SQNR) of delay-matched EDSM CANE increases by 6 dB.

It should be noted that in order to indeed form a filter response, one should combine the multiple channels with both phase and envelope being delayed. Although only combining the digitized envelope channels can eliminate the quantization noise of the envelope, the convolution of phase path and the delay-mismatched noise residue leads to spectrum regrowth, resulting in low ACPR. FIG. 3B depicts the spectrum generated by an EDSM approach having four channels of uniform weight combining. It can be readily seen in comparing these figures that, the noise level near the signal band is higher in FIG. 3B than in FIG. 3A.

A two-channel CANE technique was applied to an X-band RF transmitter which contains two X-band power amplifiers with each of them designed in the form of Pulsed loaded Modulation (PLM) PA. They are combined at the output with a T-junction that is connected to PLM junction through a quarter wavelength long transmission line. The purpose of the quarter wavelength transmission line is to transform the short circuit load impedance of the out-of-band component created at the T-junction to a higher load impedance seen at the PLM junction for the benefit of reflecting the noise power back to the supply for better power efficiency.

Figure 4A:
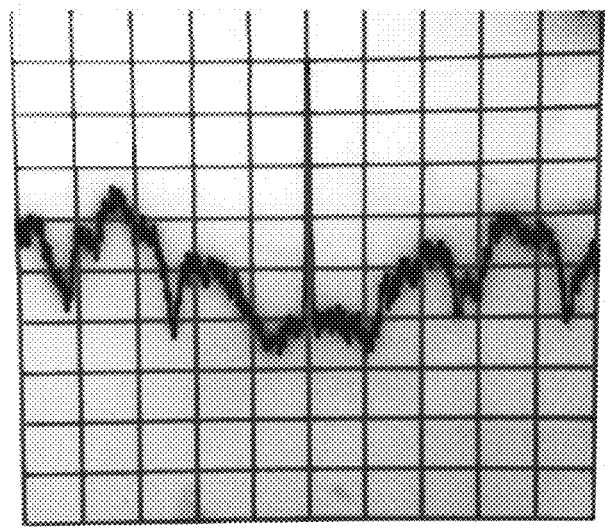
FIG. 4A and FIG. 4B are spectra seen before and after CANE processing for a 2-Channel X-band EDSM transmitter according to an embodiment of the present disclosure.
Figure 4B:
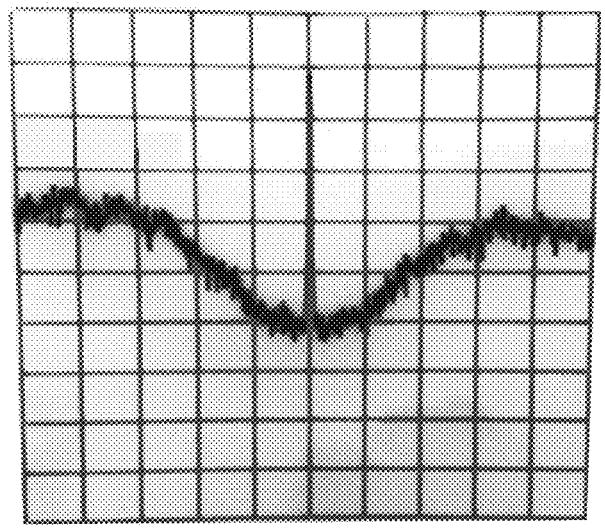

FIG. 4A and FIG. 4B compare measured spectrum before CANE (FIG. 4A) and after CANE (FIG. 4B) depicted for a 5-MHz WCDMA signal sampled at 2 Gbps with 2-level EDSM.

4. Conclusion

Both simulated and experimental results, confirm that EDSM with CANE successfully suppresses near band quantization noise of a bitstream modulated transmitter. This structure decouples the carrier frequency with the sampling rate and time delay units, leading to a more flexible active filtering behavior. The power of the multiple channels are combined efficiently in the pass-band and the out-of-band noise power is eliminated. As shown from the experimental results, the power combining scheme can be configured properly so that the suppressed noise power is reflected back to the power supply without creating efficiency loss.

From the description herein, it will be appreciated that that the present disclosure encompasses multiple embodiments which include, but are not limited to, the following:

1. An apparatus for band pass filtering with channelized active noise elimination, comprising: (a) a baseband transmitter configured for generating a complex baseband signal; (b) a bitstream modulation circuit coupled to said baseband transmitter for receiving said complex baseband signal; (c) a circuit for generating a complex digitized envelope; and (d) a digital-to-analog converter having finite impulse response (FIR) filtering based on power combining and configured with multiple conversion paths with outputs combined at a signal combiner, which outputs an radio-frequency (RF) signal; (e) wherein each conversion path of said multiple conversion paths comprises a series combination of a delay-line, a vector modulator, and a power amplifier, with the combination configured for channelized noise elimination, and with low pass characteristics of said FIR filtering used with an upconverted carrier to form a band pass filter.

2. The apparatus of any preceding embodiment, wherein said bitstream modulation circuit comprises an envelope delta sigma modulation (EDSM) circuit.

3. The apparatus of any preceding embodiment, wherein selection of the time delay in each said delay-line, and the sampling rate in the digital-to-analog conversion process are independent of the carrier frequency.

4. The apparatus of any preceding embodiment, wherein said carrier frequency can be significantly higher than said sampling frequency.

5. The apparatus of any preceding embodiment, wherein the time delay in each said delay-line is determined for satisfying filtering requirements in said FIR filtering.

6. The apparatus of any preceding embodiment, wherein each said vector modulator is configured to modulate a complex sequence on a carrier frequency.

7. The apparatus of any preceding embodiment, wherein said signal combiner comprises active or passive circuitry.

8. The apparatus of any preceding embodiment, wherein said signal combiner comprises passive circuitry comprising transmission line based power combining, hybrid blocks, or transformer based power combiners.

9. The apparatus of any preceding embodiment, wherein said signal combiner is configured for weighting inputs from each of said multiple conversion paths.

10. The apparatus of any preceding embodiment, wherein said signal combiner comprises a multiport transformer with multiple input ports and a combined output port.

11. The apparatus of any preceding embodiment, wherein number of wire turns at each input port determines said weighting of inputs from each of said multiple conversion paths, while a ratio of input to output turns determines impedance matching.

12. The apparatus of any preceding embodiment, wherein each said power amplifier comprises a switched-mode amplifier.

13. The apparatus of any preceding embodiment, wherein each said power amplifier is selected from a group of power amplifiers consisting of Class D amplifiers, Class S amplifiers, and PLM with single-ended switched-mode power amplification in Class B, Class E, or Class F.

14. The apparatus of any preceding embodiment, wherein bandpass filtering of the finite impulse response (FIR) filter utilizes a higher order pass band of to suppress quantization noise of digitized Radio Frequency (RF) signal with a pass band at signal carrier frequency.

15. The apparatus of any preceding embodiment, wherein said apparatus benefits from a combining effect of multiple channel power amplifiers which suppresses output noise while maintaining high operating efficiency of the power amplifier in each channel.

16. An apparatus for band pass filtering with channelized active noise elimination, comprising: (a) a baseband transmitter configured for generating a complex baseband signal; and (b) a digital-to-analog converter, coupled to said baseband transmitter for receiving said complex baseband signal, having finite impulse response (FIR) filtering based on power combining and configured with multiple conversion paths with outputs combined at a signal combiner, which outputs an radio-frequency (RF) signal; (c) wherein each conversion path of said multiple conversion paths comprises a series combination of a delay-line, a vector modulator, and a power amplifier, with the combination configured as a filter to suppress correlated noise and distortion generated in the power amplifiers.

17. An apparatus for band pass filtering with channelized active noise elimination, comprising: (a) a radio frequency (RF) transmission path; and (b) a Finite Impulse Response (FIR) filter incorporated into Envelope Delta Sigma Modulation (EDSM) within said radio frequency (RF) transmission path; (c) wherein channelized active noise elimination (CANE) is performed in a combination of said FIR and said EDSM in which low pass characteristics of said FIR filter are upconverted to form a band pass filter.

18. An apparatus for band pass filtering with channelized active noise elimination, comprising: (a) a radio frequency (RF) transmission path generating an input signal $x_B(t)$; and (b) a plurality of delay lines for each input channel of said input signal $x_B(t)$, wherein for each channel i, the delayed signal is $x_i(t)=x_B(t-i\tau)e^{j2\pi f_c t}$; (c) wherein $x_B(t)$ comprises a baseband complex digitized constant envelope signal that has been filtered by a lowpass Envelope Delta-Sigma Modulation (EDSM) filter to generate an output signal.

19. The apparatus of any preceding embodiment, further comprising a plurality of signal combiners that combine delayed signals to a combined output signal $y(t)=Ae^{j2\pi f_c t}\sum_{i=0}^{N-1}C_i x_B(t-i\tau)$.

20. The apparatus of any preceding embodiment, wherein the output signal has a spectrum $Y(f)=AX_B(f-f_c)H(f-f_c)$, wherein $X_B(f)$ is baseband signal spectrum and $H(f)$ is equivalent filter frequency response given by $H(f)=\sum_{i=0}^{N-1}C_i e^{-j\cdot 2\pi f\tau}$.

21. A method of pass band filtering utilizing channelized active noise elimination (CANE), comprising: (a) incorporating Finite Impulse Response (FIR) filtering into Envelope Delta Sigma Modulation (EDSM) of a radio frequency (RF) transmitter; and (b) upconverting low pass characteristics of the FIR filter to form a band pass filter.

22. A method of pass band filtering utilizing channelized active noise elimination (CANE), comprising: (a) creating a number of input channels of an input signal $x_B(t)$; (b) delaying signals on said input channels of an input signal $x_B(t)$; (c) wherein for each channel i, with delayed signal as $x_i(t)=x_B(t-i\tau)e^{j2\pi f_c t}$; wherein $x_B(t)$ comprises a baseband complex digitized constant envelope signal that has been filtered by a lowpass Envelope Delta-Sigma Modulation (EDSM) filter.

23. The method of any preceding embodiment, further comprising combining delayed input signals and outputting a combined signal $y(t)=Ae^{j2\pi f_c t}\sum_{i=0}^{N-1}C_i x_B(t-i\tau)$.

24. The method of any preceding embodiment, wherein output of said combined signal has a spectrum $Y(f)=AX_B(f-f_c)H(f-f_c)$ where $X_B(f)$ is a baseband signal spectrum and $H(f)$ is equivalent filter frequency response given by $H(f)=\sum_{i=0}^{N-1}C_i e^{-j\cdot 2\pi f\tau}$.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for band pass filtering with channelized active noise elimination, the apparatus comprising:
   (a) a baseband transmitter configured for generating a complex baseband signal;
   (b) a bitstream modulation circuit coupled to said baseband transmitter for taking an envelope from said complex baseband signal and outputting a digitized envelope;
   (c) a circuit for receiving said digitized envelope, which is multiplied by phase of an original baseband signal and generating a complex digitized envelope; and
   (d) a digital-to-analog converter receiving said complex digitized envelope, said digital-to-analog converter having finite impulse response (FIR) filtering based on power combining and configured with multiple conversion paths, as channels of said digital-to-analog converter, with outputs combined at a signal combiner that combines power from the multiple conversion paths in a pass-band while eliminating out-of-band noise power, and which outputs a radio-frequency (RF) signal;
   (e) wherein each conversion path of said multiple conversion paths comprises a series combination of a delay-line, a vector modulator receiving a carrier frequency and modulating a complex sequence on that carrier, and a power amplifier, with the combination configured for channelized noise elimination, and with low pass characteristics of said FIR filtering used with an upconverted carrier to form a band pass filter.

2. The apparatus as recited in claim 1, wherein said bitstream modulation circuit comprises an envelope delta sigma modulation (EDSM) circuit.

3. The apparatus as recited in claim 1, wherein selection of a time delay in each said delay-line, and a sampling rate in said digital-to-analog converter, are independent of said carrier frequency.

4. The apparatus as recited in claim 3, wherein said carrier frequency is significantly higher than said sampling rate.

5. The apparatus as recited in claim 3, wherein the time delay in each said delay-line is determined for satisfying filtering requirements in said FIR filtering.

6. The apparatus as recited in claim 1, wherein each said vector modulator is configured to modulate a complex sequence on a carrier frequency.

7. The apparatus as recited in claim 1, wherein said signal combiner is configured for weighting each of its inputs from each of said multiple conversion paths.

8. The apparatus as recited in claim 1, wherein each power amplifier of said multiple conversion paths comprises a switched-mode amplifier.

9. The apparatus as recited in claim 1, wherein each power amplifier of said multiple conversion paths is selected from a group of power amplifiers consisting of Class D amplifiers, Class S amplifiers, and pulse located modulation (PLM) with single-ended switched-mode power amplification in Class B, Class E, or Class F.

10. The apparatus as recited in claim 1, wherein band pass filtering of the apparatus having the combining effect of multiple channel power amplifiers and which utilizes a higher order pass band of the apparatus to suppress quantization noise of digitized Radio Frequency (RF) signal with a pass band at a signal carrier frequency.

11. The apparatus as recited in claim 1, wherein said apparatus benefits from a combining effect of multiple channel power amplifiers which suppresses output noise while maintaining high operating efficiency of the power amplifier in each multiple conversion path.

12. An apparatus for band pass filtering with channelized active noise elimination, comprising:
(a) a baseband transmitter configured for generating a complex baseband signal; and
(b) a digital-to-analog converter, coupled to said baseband transmitter for receiving said complex baseband signal, wherein said digital-to-analog converter has a finite impulse response (FIR) filtering based on power combining and configured with multiple conversion paths, as channels of said digital-to-analog converter, with outputs combined at a signal combiner that combines power from the multiple conversion paths in a pass-band while eliminating out-of-band noise power, which outputs a radio-frequency (RF) signal;
(c) wherein each conversion path of said multiple conversion paths comprises a series combination of a delay-line, a vector modulator receiving a carrier frequency and modulating a complex sequence on that carrier, and a power amplifier, with the combination configured as a filter to suppress correlated noise and distortion generated in the power amplifiers.

13. An apparatus for band pass filtering with channelized active noise elimination (CANE), comprising:

a radio frequency (RF) transmission path;
an Envelope Delta Sigma Modulation (EDSM) circuit in combination with a digital-to-analog converter, which together are configured for providing upconverted Finite Impulse Response (FIR) filtering, within said radio frequency (RF) transmission path; and
said digital-to-analog converter having finite impulse response (FIR) filtering based on power combining and configured with the channelized active noise elimination (CANE) having multiple conversion paths, each conversion path having a vector modulator configured for receiving a carrier frequency and modulating a complex sequence on that carrier, and each conversion path having a power amplifier configured for outputting signals to a signal combiner that combines power from the multiple conversion paths in a pass-band while eliminating out-of-band noise power and which outputs a radio-frequency (RF) signal;
wherein said channelized active noise elimination (CANE) is performed in which low pass characteristics of the finite impulse response (FIR) filtering are upconverted to form band pass filtering of said apparatus.

14. An apparatus for band pass filtering with channelized active noise elimination, comprising:
a radio frequency (RF) transmission path generating an input signal $x_B(t)$;
a digital-to-analog converter having finite impulse response (FIR) filtering based on power combining and configured with multiple conversion paths with outputs combined at a signal combiner that combines power from the multiple conversion paths in a pass-band while eliminating out-of-band noise power, and which outputs a radio-frequency (RF) signal;
wherein each conversion path of said multiple conversion paths comprise a delay line, a vector modulator receiving a carrier frequency and modulating a complex sequence on that carrier, and a power amplifier; and
a plurality of delay lines in said digital-to-analog converter for delaying each input channel of said input signal $x_B(t)$ to a delayed signal, wherein for each channel i, the delayed signal is $x_i(t)=x_B(t-i\tau)e^{j2\pi f_c t}$;
wherein $x_B(t)$ comprises a baseband complex digitized constant envelope signal that has been filtered by lowpass Envelope Delta-Sigma Modulation (EDSM) to generate an output signal; and
wherein t is time, i is channel number for each of said multiple conversion paths, $\tau$ is delay unit, j denotes imaginary plane, and $f_c$ is carrier frequency.

15. The apparatus as recited in claim 14, wherein the signal combiner provides a combined output signal $$y(t)=Ae^{j2\pi f_c t}\Sigma_{i=0}^{N-1}C_i x_B(t-i\tau);$$

wherein A is amplification, N are input ports to said signal combiner, and $C_i$ are gains for each of said multiple conversion paths.

16. The apparatus as recited in claim 15, wherein the output signal has a spectrum $Y(f)=AX_B(f-f_c)H(f-f_c)$, wherein $X_B(f)$ is baseband signal spectrum and $H(f)$ is equivalent filter frequency response given by $$H(f)=\Sigma_{i=0}^{N-1}C_i e^{-j\cdot 2\pi f\tau}.$$

17. A method of pass band filtering utilizing channelized active noise elimination (CANE), comprising:
incorporating Finite Impulse Response (FIR) filtering into a combination of Envelope Delta Sigma Modulation (EDSM) and digital-to-analog conversion having channelized noise elimination (CANE) of a radio frequency (RF) transmitter;

utilizing multiple conversion paths during the digital-to-analog conversion with outputs combined at a signal combiner that combines power from the multiple conversion paths in a pass-band while eliminating out-of-band noise power, to output a radio-frequency (RF) signal; and upconverting low pass characteristics of the FIR filtering, forming a band pass filter.

18. A method of pass band filtering utilizing channelized active noise elimination (CANE), comprising:

creating a number of input channels of an input signal $x_B(t)$;

performing digital-to-analog conversion utilizing multiple conversion paths and combining outputs at a signal combiner that combines power from the multiple conversion paths in a pass-band while eliminating out-of-band noise power, to output a radio-frequency (RF) signal; and delaying signals on said input channels of the input signal $x_B(t)$ during said digital-to-analog conversion;

wherein each conversion path of said multiple conversion paths comprise a delay line, a vector modulator receiving a carrier frequency and modulating a complex sequence on that carrier, and a power amplifier;

wherein for each channel i, with a delayed signal as $x_i(t) = x_B(t - i\tau)e^{j2\pi f_c 1}$;

wherein $x_B(t)$ comprises a baseband complex digitized constant envelope signal that has been filtered by lowpass Envelope Delta-Sigma Modulation (EDSM); and wherein t is time, $\tau$ is channel number for each conversion path of said multiple conversion paths, $\tau$ is delay unit, j denotes imaginary plane, and $f_c$ is carrier frequency.

19. The method as recited in claim 18, further comprising outputting a combined signal from said signal combiner $$y(t) = Ae^{j2\pi f_c t} \Sigma_{i=0}^{N-1} C_i x_B(t - i\tau);$$

wherein A is amplification, N are input ports to said signal combiner, and $C_i$ are gains for each conversion path of said multiple conversion paths.

20. The method as recited in claim 19, wherein said combined signal has a spectrum $Y(f) = AX_B(f - f_c)H(f - f_c)$ where $X_B(f)$ is a baseband signal spectrum and $H(f)$ is an equivalent filter frequency response given by $$H(f) = \Sigma_{i=0}^{N-1} C_i e^{-j \cdot i 2\pi f \tau}.$$

* * * * *